(12) United States Patent
Chaiko

(10) Patent No.: US 7,919,185 B2
(45) Date of Patent: Apr. 5, 2011

(54) POLYMER COMPOSITES, POLYMER NANOCOMPOSITES AND METHODS

(76) Inventor: David J. Chaiko, Rapid City, SD (US)

( * ) Notice: Subject to any disclaimer, the term of this patent is extended or adjusted under 35 U.S.C. 154(b) by 0 days.

(21) Appl. No.: 11/706,259

(22) Filed: Feb. 15, 2007

(65) Prior Publication Data

US 2007/0191510 A1  Aug. 16, 2007

Related U.S. Application Data

(60) Provisional application No. 60/773,371, filed on Feb. 15, 2006.

(51) Int. Cl.
C08K 9/00 (2006.01)
(52) U.S. Cl. ........ 428/407; 428/402; 501/145; 524/445; 524/447; 524/186; 523/200; 523/205
(58) Field of Classification Search ........... 524/445, 524/447, 186; 501/145; 428/402–407; 523/200, 523/205
See application file for complete search history.

(56) References Cited

U.S. PATENT DOCUMENTS

| | | | |
|---|---|---|---|
| 2,531,427 A | 11/1950 | Hauser | |
| 2,531,440 A | 11/1950 | Jordan | |
| 2,875,152 A | 2/1959 | Van Scoy | |
| 3,977,894 A | 8/1976 | White et al. | |
| 4,105,578 A | 8/1978 | Finlayson et al. | |
| 4,208,218 A | 6/1980 | Finlayson | |
| 4,365,030 A | 12/1982 | Oswald et al. | |
| 4,382,868 A | 5/1983 | House | |
| 4,565,836 A * | 1/1986 | Emerson et al. | 523/346 |
| 5,075,033 A | 12/1991 | Cody et al. | |
| 5,110,501 A | 5/1992 | Knudson et al. | |
| 5,336,647 A | 8/1994 | Nae et al. | |
| 5,807,629 A | 9/1998 | Espass et al. | |
| 6,103,817 A | 8/2000 | Usuki et al. | |
| 6,271,297 B1 | 8/2001 | Ishida | |
| 6,271,298 B1 | 8/2001 | Powell | |
| 6,407,155 B1 | 6/2002 | Qian et al. | |
| 6,451,895 B1 * | 9/2002 | Topolkaraev et al. | 524/445 |
| 6,462,096 B1 | 10/2002 | Dino et al. | |
| 6,521,678 B1 | 2/2003 | Chaiko | |
| 6,841,226 B2 | 1/2005 | Dontula et al. | |
| 6,864,308 B2 | 3/2005 | Rosenthal et al. | |
| 6,884,834 B2 | 4/2005 | Reinking et al. | |
| 7,157,516 B2 | 1/2007 | Chaiko | |
| 7,160,942 B2 | 1/2007 | Chaiko | |
| 2005/0137287 A1 | 6/2005 | Giannelis et al. | |
| 2005/0222316 A1 * | 10/2005 | Kato et al. | 524/445 |
| 2006/0020057 A1 * | 1/2006 | Maas et al. | 523/220 |
| 2006/0235128 A1 * | 10/2006 | Wang et al. | 524/445 |
| 2007/0032585 A1 | 2/2007 | Giannelis et al. | |
| 2007/0129477 A1 * | 6/2007 | Weng et al. | 524/394 |

FOREIGN PATENT DOCUMENTS

| | | |
|---|---|---|
| DE | 44 31 409 | 5/1996 |
| WO | 96/07717 | 3/1996 |
| WO | 2004/113429 | 12/2004 |

OTHER PUBLICATIONS

Vaia and Gianella, "Polymer Melt Intercalation in Organically-Modified Layered Silicates: Model Predictions and Experiment," Macromolecules, 1997, p. 8000-8009, vol. 30, No. 25, American Chemical Society.

Manias, Touny, Wu. Strawhecker, Lu and Chung, "Polypropylene/Montmorillonite Nanocomposites. Review of the Synthetic Routes and Materials Properties." Chem. Mater., 2001, p. 3516-3523, vol. 13, No. 10, American Chemical Society.

Boyd, Farmer, Jaynes, Lagaly, Laird, and Mermut, "Layer Change Characteristics of 2:1 Silicate Clay Minerals," CMS Workshop Lectures, p. 5, vol. 6, The Clay Minerals Society, Boulder, CO., Oct. 2001.

Ho and Glinka, "Effectes of Solvent Solubility Parameters on Organoclay Dispersions," Chem. Mater., 2003, p. 1309-1312, American Chemical Society.

Jordan, John W., "Organophilic Bentonites I," J. Phys. Colloid Chem., 1949, p. 294-206, vol. 53, Mellon Institute, Pittsburgh, Pennsylvania.

Jordan, Hook, and Finlayson, "Organophilic Bentonites II," J. Phys. Colloid Chem., 1950, p. 1196-1208, vol. 54, Mellon Institute, Pittsburgh, Pennsylvania.

Jordan and Williams, "Organophilic Bentonites III," Kolloid-Zeitschrift, 1954, p. 40-48, vol. 137.

* cited by examiner

Primary Examiner — Callie E Shosho
Assistant Examiner — Ronak Patel

(57) ABSTRACT

Polymer composites and polymer nanocomposites are designed and manufactured by choosing surface-modified fillers having a solid surface energy matching the solid surface energy of the polymer, wherein the advancing contact angle of the polymer on the surface-modified filler is less than about 5 degrees. The fillers are surface-modified by adsorption of amorphous polymeric surfactants, consisting of either mono-modal, bimodal, or multi-modal size distribution. The surface-modified fillers of this invention display a measurable yield stress and a viscosity of about 30.000 Pa·s or less at room temperature, and comprise one or more materials selected from the group consisting of minerals, plant material, animal material, carbon fiber, graphite, amorphous carbon, carbon nanotubes, and glass fiber. This invention also provides a method for manufacturing a polymer nanocomposite which includes exfoliating an amorphous organoclay in a crystalline or semi-crystalline polymer by melt compounding the constituents in the absence of added solvents, activators, edge-modifiers, compatibilizers, or hydrotropes.

26 Claims, No Drawings

POLYMER COMPOSITES, POLYMER NANOCOMPOSITES AND METHODS

RELATED APPLICATIONS

This Application claims priority to U.S. Provisional Application No. 60/773,371, filed Feb. 15, 2006, and herein incorporated by reference in its entirety for all purposes.

FIELD OF THE INVENTION

This invention relates to the design and formation of surface-modified fillers, polymer composites, and polymer nanocomposites. More particularly, the present invention relates to surface-modified fillers and the use of the surface-modified fillers in the formation of polymer composites and polymer nanocomposites by matching the solid surface energy of the surface-modified filler with the solid surface energy of the polymer.

BACKGROUND OF THE INVENTION

It is well recognized that the successful dispersion and exfoliation of nanoparticles, like hydrous metal hydroxides (e.g., hydrotalcite) and clays (e.g., montmorillonite, saponite, hectorite, mica), requires surface treatment of the filler to promote wetting by hydrophobic polymers. For example, one common surface treatment applied to smectite clays, which dates back to the 1940s, involves ion exchange reactions between the basal surface of the clay and quaternary amines, such as dimethyl dihydrogenated tallow ammonium chloride and methyl benzyl dihydrogenated tallow ammonium chloride.

However, the prior art methods of forming polymer nanocomposites have failed to produce polymer nanocomposites that exhibit the expected performance characteristics suggesting that such methods are fundamentally flawed. For example, it is well known that the barrier properties of a polymer may be improved by forming a polymer-phyllosilicate nanocomposite. The mechanism responsible for barrier improvement is believed to involve the generation of a torturous diffusion path in which diffusing species must navigate a long and torturous path around the impermeable phyllosilicate platelets dispersed in the polymer matrix. Under the ideal conditions of complete phyllosilicate nanoparticle exfoliation and perfect platelet alignment within the polymer matrix, the reduction in gas permeability will be a function of the square of the phyllosilicate loading and the inverse square of the platelet aspect ratio. Accordingly, the steady-state gas permeability of the nanocomposite is expected to be reduced by as much as several hundred fold relative to the gas-permeability of the polymer with only 5-10 vol % nanoparticle loading. However, the barrier improvements in various polyolefin nanocomposite systems have been reported to be only two to four-fold at best suggesting that exfoliation of a surface-modified filler (in this example, the organophyllosilicate), according to prior art methods, is flawed in producing polymer nanocomposites, as evidenced by the significant variance in the barrier performance of prior art polymer nanocomposites from the expected barrier performance. The reasons for this deficiency in the prior art methods are undoubtedly multi-fold and complex, but it is clear that there is a need for methods of forming polymer nanocomposites which obviate the deficiencies of the prior art.

Some reasons for the deficiencies of the prior art appear to be (1) the failure of the prior art to appreciate the relationship between the spatial distribution of charge within the crystal lattice of a filler (e.g., clay) and self-assembled surfactant structures; and (2) the failure of the prior art to appreciate the correlation between the surface energy (i.e., critical surface tension) of the surface-modified filler surface and wetting by the polymer.

Other than the effects of the ion exchange capacity (e.g., CEC as it relates to the exchange of cations) of the filler on surfactant chain conformation, the prior art has failed to appreciate the relationship between the spatial distribution of charge within the crystal lattice of the filler and self-assembled surfactant structures. The prior art appears to be founded on the assumption that the charge centers within the filler are homogeneously distributed, and that the ion charge centers within in the interlayer space are also homogeneously distributed. These assumptions appear to persist despite the fact that no scientific evidence has been forthcoming to conclusively support these assumptions.

As it relates to the formation of organoclay-polymer nanocomposites, the prior art has failed to appreciate the presence of cationic charge segregation and its effect on organoclay properties. According to the present disclosure, it has been discovered that the existence of a two-dimensional amphiphilic surface morphology, resulting from cationic charge segregation, may explain why melt intercalation using organoclays of the prior art have heretofore failed to produce nanocomposites with polyolefin homopolymers. The state of cationic charge segregation is consistent with observations that water is rapidly adsorbed by organoclays prepared by prior art methods. Furthermore, Vaia and Giannelis in *Macromolecules*, 30, 8000-8009 (1997) ('97) conclude that the existence of polar interactions are a critical prerequisite for the formation of intercalated and exfoliated nanocomposites by melt intercalation.

The existence of a two-dimensional, amphiphilic morphology is further supported by the fact that organoclays of prior art methods are known to those skilled in the art to spread and form a monolayer at air/water interfaces. However, the significance of this spreading behavior in relation to the production of clay/polymer nanocomposites has not heretofore been recognized. According to the present disclosure, a surface-modified filler (e.g., organoclay) surface is more appropriately characterized by a surface hydrophilic lipophilic balance (HLB), rather than a solubility parameter as disclosed in U.S. Pat. No. 6,271,297 B1. Furthermore, the exfoliation of lamellar liquid crystal systems (e.g., organoclays), in organic solvents, is known to be limited by entropic effects, rather than effects relating to solubility parameters. In other words, the phase equilibrium (i.e., the tie line) existing between a lamellar liquid crystal phase and a continuous organic phase has never been shown to be dependent upon the solubility parameter of the organic phase. Consequently, solubility and cohesion parameters can provide no fundamental insight to the understanding of nanocomposite formation. While the utility of the surface HLB value has been discussed in prior art (see for example U.S. Pat. No. 7,160,942 B2), no method has been forthcoming to measure such values, nor has any prior art recognized the interrelation between solid surface energy, the surface HLB value, and the ability to produce clay/polymer nanocomposites by either melt intercalation or melt compounding of polyolefin homopolymers.

While the use of interfacial tension forces to estimate the nature and extent of interaction energies has been described in prior art (see Vaia and Giannelis ('97)), the approach does not contemplate nor demonstrate the effects of cation segregation on surface energy. Prior art methods for estimating interaction energies are based on van Oss theory, which has been used to define required polymer characteristics for producing an exfoliated nanocomposite system. In accordance with van Oss theory, prior art methods have emphasized organoclay designs that maximize the number of possible interaction sites between the polymer and the interlayer surface (i.e., bare clay surface deep within the palisade layer). However, according to the present disclosure, it has been discovered that the key to developing self-dispersing organoclays for polymers such as polyolefin homopolymers is to make the organoclay surface 'organic-like' as much as possible and to minimize or completely eliminate interactions between the polymer and the interlayer surface.

As is known, wetting of the organoclay surface by the polymer is a prerequisite for nanocomposite formation. However, the prior art has failed to appreciate the correlation between the surface energy (i.e., critical surface tension) of the surface-modified filler (e.g., the organoclay) surface with polymer wetting. It appears that the prior art has assumed that the contact angles at the organoclay/polymer interface are zero, despite the lack of scientific evidence in support of this assumption.

Accordingly, there is a need for the design and formation of new surface-modified fillers that enable significant improvements in the ease of dispersion of the nanoparticles, and which provide polymer composites and nanocomposites that demonstrate significant improvements in physical properties, such as increased transparency, reduced scattering of visible light, mechanical properties and barrier performance. Furthermore, there is a need for methods to control cation charge distribution within the interlayers of surface-modified filler, to facilitate control over the surface hydrophilic/lipophilic balance of the surface-modified filler.

SUMMARY OF THE INVENTION

The present invention provides novel surface-modified fillers, polymer composites, and polymer nanocomposites, and methods of forming surface-modified fillers, polymer composites and polymer nanocomposites. The present invention also provides a method of forming nanocomposites with essentially no waste.

In one aspect, the present invention provides a surface-modified filler having a measurable yield stress at substantially room temperature, and polymer nanocomposites formed therefrom.

In other aspects, the present invention provides nanocomposites comprising: a filler having an amorphous coating on at least a portion of the surface thereof dispersed in the matrix of a crystalline or semi-crystalline polymer; a surface-modified filler and a polymer wherein an advancing contact angle of said polymer on said surface-modified filler is no more than about five degrees; a surface-modified filler dispersed in a polyolefin matrix displaying substantially no low angle scattering of visible light when in a melt state; a surface-modified filler dispersed in a polymer matrix displaying no low angle scattering of visible light when in a melt state and not containing any one or more of a compatibilizer, activator, hydrotrope, solvent, or edge modifier.

The present invention also provides nanocomposites that do not contain any one or more of a compatibilizer, activator, hydrotrope, solvent, or edge modifier; and nanocomposites consisting essentially of a surface-modified filler dispersed in a polymer matrix displaying substantially no low angle scattering of visible light when in a melt state.

The present invention also provides a surface-modified filler having low surface HLB values, including surface-modified fillers having surface HLB values of less than about 0.20, or less than about 0.15, or less than about 0.10, or less than about 0.05.

The present invention also provides a surface-modified filler comprising a mineral having a surface and an amorphous onium salt associated with at least a portion of said surface.

The present invention also provides a method of forming a surface-modified filler comprising adsorbing an amorphous polymeric surfactant having either a mono-modal, bimodal, or multi-modal size distribution onto a surface of a filler. The preferred surfactants comprise a surfactant selected from the group consisting of trimethyl polyisobutylene ammonium salts and polyisobutylene amine salts of HCl, HBr, HI, $HNO_3$, $H_2SO_4$, $H_3PO_4$, $HCH_3SO_4$, CHOOH, $CH_3COOH$, and $CH_3CH_2COOH$.

The present invention also provides a method of forming a surface-modified filler comprising: (a) emulsifying an amorphous surfactant with water; (b) blending the emulsified surfactant with a filler to effect adsorption of the surfactant on at least a portion of the surface of the filler; and (c) drying the blend to reduce the water content to less than fifty percent by weight. The preferred surfactant comprises an onium salt and wherein the preferred ratio of the weight of the water to the weight of the onium salt in the emulsified surfactant is no more than about three. The preferred onium salt is selected from the group consisting of polyisobutylene amine salts of HCl, HBr, HI, $HNO_3$, $H_2SO_4$, $H_3PO_4$, $HCH_3SO_4$, CHOOH, $CH_3COOH$, and $CH_3CH_2COOH$.

The present invention also provides a method of producing a nanocomposite comprising compounding a surface-modified filler with a polymer wherein an advancing contact angle of the polymer on the surface-modified filler is no more than about five degrees; and a method of producing a nanocomposite comprising: providing a surface-modified filler; providing a polymer that wets the surface-modified filler; and compounding the surface-modified filler with the polymer to thereby nano disperse the surface-modified filler in the matrix of the polymer. In a preferred embodiment, the compounding is performed in the absence of any one or more of compatibilizers, activators, hydrotropes, or solvents.

The present invention also provides a method of selecting a surface-modified filler for compounding with a polymer to form a nanocomposite which includes selecting a polymer; and selecting a surface-modified filler for compounding with the selected polymer wherein the advancing contact angle of the polymer on the surface-modified filler is no more than about five degrees.

The present invention also provides a method comprising: (a) emulsifying a water-insoluble onium salt with water wherein the weight ratio of the water to the onium salt is no more than about three; (b) blending the emulsified onium salt with a filler selected from the group consisting of smectites, vermiculites, micas, and brittle micas to effect adsorption of the onium salt onto the surface of the filler; (c) drying the blended emulsified onium salt and filler so that the water content of the blend is no more than about fifty percent; and (d) compounding the dried blend with a polymer wherein the advancing contact angle of the polymer on the dried blend is no more than about five degrees. In a preferred embodiment, the compounding is performed in the absence of any one or more of compatibilizers, activators, hydrotropes, or solvents.

The present invention also provides surface-modified fillers possessing exceptionally low surface HLB values through the application of water-immiscible, amorphous surfactants onto the filler surface. In one aspect of the invention, the filler comprises a mineral. In another aspect of the invention, the filler comprises a phyllosilicate. In another aspect of the invention, the phyllosilicate surface is modified by onium intercalation with an amorphous surfactant to produce an amorphous organoclay. In yet another aspect of the present invention a method is provided to measure the surface HLB value of a surface-modified filler. In another aspect of the present invention, methods are provided to prepare polymer nanocomposites from semi-crystalline, polyolefin homopolymers without the use of polar activators, edge-modifiers, dispersants, solvents, oligomers, hydrotropes, or compatabilizing agents. In still yet another aspect of the present invention, methods are provided for the manufacture of phyllosilicate/polymer nanocomposites with complete elimination of waste generation and significant reduction in energy usage.

As used herein, the term "mineral filler" refers to metal carbonates, metal hydroxides, metal oxides, hydrous metal hydroxides and phyllosilicates;

the term "onium intercalation" refers to onium exchange reactions wherein the phyllosilicate is treated with a water-immiscible onium salt without prior exfoliation of the phyllosilicate;

the term "amorphous surfactant" refers to a surfactant displaying a glass transition temperature in the absence of melt transition temperatures;

the term "amorphous coating" refers to a coating displaying a glass transition temperature in the absence of melt transition temperatures the term "amorphous organoclay" is defined as a surface-modified phyllosilicate having a measurable yield stress at room temperature and a viscosity of about 30,000 Pa·s or less;

the term "surface HLB" refers to hydrophilic lipophilic balance and is defined as the ratio between the polar and non-polar components of the solid surface energy as defined in Owens Wendt theory.

DETAILED DESCRIPTION OF THE INVENTION

The composite and nanocomposite materials of the present invention comprise either a crystalline or semi-crystalline polymer compounded with one or more surface-modified fillers. The filler comprises one or more of minerals, plant material, animal material, carbon fiber, glass fiber, carbon nanotubes, amorphous carbon, and graphite. In one embodiment, the filler is a mineral filler and can be selected from the group of calcium carbonate, hydrous metal hydroxides, and phyllosilicates, which include smectites, vermiculites, micas, and brittle micas. In another embodiment, the filler may be naturally occurring or it may be a synthetic material. In yet another embodiment of this invention, the filler may be comprised of mixtures of phyllosilicates, which in turn may comprise mixtures of natural and synthetic phyllosilicates. Preferred natural phyllosilicates include montmorillonite and saponite clays because of their low cost and ease of surface modification. Preferred synthetic phyllosilicates include fluorophlogopite mica and Laponite®, a synthetic hectorite.

In one embodiment of this invention, the filler is surface-modified to produce the characteristics of (1) low surface HLB value as defined by the ratio $\sigma_S^P/\sigma_S^D$ where $\sigma_S^P$ is the polar component of the solid surface energy and $\sigma_S^D$ is the non-polar component of the solid surface energy, and (2) a measurable yield stress at room temperature and a viscosity of about 30,000 Pa·s or less. The surface HLB values are obtained by the application of Owens Wendt theory to interfacial contact angle measurements performed on compressed films of the surface-modified filler. The yield stress and viscosity are measured using conventional Theological techniques such as a capillary rheometer or a cone and plate viscometer according to ASTM D 1238; D 1823; D3835.

In another embodiment of this invention, the surface-modified fillers have a characteristic solid surface energy ($\sigma_s$) that permits surface wetting of the surface-modified filler by the polymer matrix of the nanocomposite material, wherein $\sigma_S = \sigma_S^P + \sigma_S^D$. A state of surface wetting is herein defined as an advancing contact angle of the polymer on the surface-modified filler that is no more than about 5 degrees.

In one embodiment of the present invention, the semi-crystalline polymer used in preparing the composites and nanocomposites is chosen from the group of polyolefin homopolymers. Non-limiting examples of which include polypropylene, linear low density polyethylene, low density polyethylene, high density polyethylene, polyolefin copolymers, such as ethylene propylene copolymers, ethylene vinyl alcohol copolymers, ethylene vinyl acetate copolymers.

In yet another embodiment of the present invention, the polymer used in preparing the composites and nanocomposites is chosen from polyvinyl chloride, nylon, and polystyrene.

In one embodiment of the present invention, the filler is surface-modified by onium intercalation. The onium ions of this invention are amorphous and preferably chosen from one or more of trimethyl polyisobutylene ammonium chloride, polyisobutylene amine salts of HCl, HBr, HI, HNO$_3$, H$_2$SO$_4$, H$_3$PO$_4$, HCH$_3$SO$_4$, CHOOH, CH$_3$COOH, and CH$_3$CH$_2$COOH. Additionally, the onium ions of this invention are characterized as consisting of a distribution of molecular weights which may be either mono-modal, bimodal, or multimodal. The onium ions of this invention are further characterized as highly insoluble in water due to their large, average molecular area. The preferred average molecular area is defined as the minimum average molecular area required to completely cover the filler surface area when the onium ion is present at a concentration ranging between about 50% to about 120% of the ion exchange capacity of the filler. A more preferred concentration range is between about 75% to about 100% of the ion exchange capacity of the filler. The most preferred concentration range is between about 90% to about 100% of the ion exchange capacity of the filler. The preferred onium materials for producing polyolefin nanocomposites are trimethyl polyisobutylene ammonium salts with an average molecular weight of about 500 to about 3000, more preferably an average molecular weight of about 1000, and most preferably an average molecular weight of about 1500. The most preferred onium materials for producing polyolefin nanocomposites are polyisobutylene amine.HCl salts, with an average molecular weight of about 500 to about 3000, more preferably an average molecular weight of about 1000, and most preferably an average molecular weight of about 1500. However, those skilled in the art will immediately recognize the most preferred average molecular weight will depend upon the cation exchange capacity of the filler.

In accordance with one aspect of the present invention, onium intercalation is carried out by dispersing the onium material in water to produce an onium/water emulsion. The definition of said emulsion, known to those skilled in the art and incorporated herein by reference, is a dispersion of two or more immiscible components that is characterized by extremely low interfacial tension, whereby phase separation of the individual components is kinetically retarded. Furthermore, said phase separation may require hours, days, months, or years to complete. The time required for phase separation of said emulsion will increase with increasing interfacial viscosity. A preferred embodiment of the present invention provides for an onium/water emulsion displaying high interfacial viscosity.

The phyllosilicate material is combined with the onium/water dispersion and mixed for a sufficient period of time to produce a surface-modified phyllosilicate displaying the desirable surface properties of the present invention. The surface-modified phyllosilicate may be dried to further reduce the surface HLB value and thereby ease the dispersion and exfoliation of the surface-modified filler within a hydrophobic polymer. The nanocomposites of this invention are transparent and show no evidence of low-angle scattering of visible light.

In one embodiment of the present invention, the concentration of water in the onium/water dispersion will range from about 25 wt % to about 100 wt %, more preferably from about 50 wt % to about 100 wt %, and most preferably from about 50 wt % to about 75 wt %. The phyllosilicate may contain incidental surface moisture of about 1 wt % to about 5 wt %, but those skilled in the art will recognize that excessive water beyond about 5 wt % will only increase production costs of the dried organoclay and the nanocomposite material.

In one aspect, the onium intercalation according to this invention may be carried out using mixing methods known to those skilled in the art. Non-limiting examples include the use of pug mills, roll mills, ribbon mills, and extruders. The mixing is preferably carried out at room temperature, and more preferable at a temperature between about 30° C. to about 100° C., even more preferably between about 30° C. to about 80° C., and most preferably between about 60° C. to about 80° C.

The polymer nanocomposite material according to one aspect of the present invention is readily prepared by melt compounding the surface-modified phyllosilicate with the polymer. Compounding can be accomplished by methods known to those skilled in the art. Non-limiting examples include the use of single-screw extruders, twin-screw extruders, roll mills, and Banbury mixers. The preferred ratio of surface-modified phyllosilicate to polymer will be determined by the desired properties of the nanocomposite. The concentration of surface-modified phyllosilicate in the nanocomposite can range from about 100 ppm to about 75 wt %. For the production of a master batch, the concentration of the surface-modified phyllosilicate in the polymer will range from about 20 wt % to about 80 wt %, and more preferably from about 20 wt % to about 40 wt %. The master batch is normally diluted with additional polymer to a final concentration of surface-modified phyllosilicate in the polymer from about 100 ppm to about 10 wt %, preferably from about 500 ppm to about 5 wt %, and most preferably from about 1000 ppm to about 2 wt %.

By matching the surfactant chain area with the modes of the lattice charge distribution, this invention produces surface-modified fillers that are superior to prior art in their ability to disperse and exfoliate in hydrophobic solvents, oligomers, and polymers. Furthermore, the present invention produces polymer nanocomposites that are colorless, and transparent—making them ideally suited for nanocomposite packaging applications.

While clays intercalated with mixtures of two separate onium ions have been described in prior art (see for example, U.S. Pat. Nos. 5,336,647; 6,462,096 B1), matching of the surfactant's average molecular area to the average area per cation site on the clay surface, sufficient to produce a surface HLB value from about 0.2 to about 0, has been neither contemplated nor disclosed.

While not wishing to be bound by any particular theory and without limiting the scope of the invention, in one aspect the methods of the present invention improve the dispersion and exfoliation of surface-modified fillers by liquids, such as solvents, monomers, oligomers, and polymers by taking into account the solid surface energy of the surface-modified filler, and by providing methods to adjust this parameter to enable a liquid polymer to wet the surface and maintain the wetted state throughout all processing and final use conditions. Another aspect of the methods of the present invention includes the recognition of the presence of multiple surface states of differing surface energy on surface-modified phyllosilicates. These surface states are characterized by a surface distribution of hydrophilic and hydrophobic domains. The HLB values of surface-modified phyllosilicates prepared by methods according to the present invention are significantly reduced relative to the prior art. This reduction in HLB values is reflected in surface energy measurements. The surface-modified phyllosilicates prepared by methods according to the present invention are fully dispersible in hydrophobic polymers, like the polyethylenes and polypropylene and their various co-polymers, without the need for organic solvents as swelling agents, dispersing aids, compatibilizing agents, and the like as required in the prior art. See for example, U.S. Pat. No. 6,884,834 B2 (Reinking et al.); U.S. Pat. No. 7,157,516 (Chaiko); U.S. Pat. No. 6,838,508 B2 (Hsiao et al.); U.S. Pat. No. 6,271,297 (Ishida); U.S. Pat. No. 6,103,817 A (Usuki et al.); and U.S. Pat. No. 3,977,894 A (White). The surface-modified phyllosilicates according to the present invention are prepared by intercalation-exchange reactions with an onium ion in the absence of any organic solvents, polar activators, clay-edge modifiers, or hydrotrope modifiers as required in the prior art. See, for example, U.S. Pat. No. 7,157,516 (Chaiko) and U.S. Pat. No. 6,407,155 B1 (Qian et al.).

A preferred embodiment of the present invention provides a method for the design and production of polymer composites and nanocomposites which includes matching the solid surface energies of the surface-modified fillers with that of the polymer.

The nanocomposites of this invention are prepared by either melt intercalation or by melt compounding in the absence of added organic solvents, dispersants, polar activators, non-polar activators, combinations of polar and non-polar activators, oligomers, dispersing aids, or compatabilizers.

The following non-limiting examples serve to further illustrate advantages of the disclosed approach.

EXAMPLES

Comparative Example 1

An organoclay product was prepared by dispersing a bentonite clay, with a cation exchange capacity (CEC) of approximately 85 milliequivalents/100 g clay, in deionized water at 60° C. The dispersion was prepared at a solids concentration of 2 wt %, and stirred for 20 minutes to ensure full hydration of the clay. The clay was then surface modified to render it hydrophobic by onium exchange with dimethyl dihydrogenated tallow ammonium chloride (Arquad 2HT-75, Akzo Nobel) at a concentration of 110 milliequivalents quaternary amine/100 g clay. The quaternary amine was dispersed in deionized water at a concentration of 5 wt % and added in a continuous fashion to the stirred clay slurry over a period of 30 minutes. The hydrophobic organoclay was stirred for an additional 30 minutes and then filtered, redispersed in deionized water at 60° C., stirred for 15 minutes and then recovered by filtration. The organoclay filtrate was dried overnight at 40° C. The dried organoclay was mixed with polybutadiene (average molecular weight of 5000, Sigma-Aldrich) at a solids concentration of approximately 5 wt %. The organoclay filed to disperse. Instead, the organoclay produced a phase-separated system consisting of organoclay agglomerates and polymer. This example demonstrates that the chain area of the quaternary amine is too small to completely cover the basal surfaces of the clay, thereby producing an amphiphilic organoclay possessing a large surface HLB value.

Comparative Example 2

An organoclay product was prepared by dispersing a bentonite clay, with a CEC of approximately 85 milliequivalents/ 100 g clay, in deionized water at 60° C. The dispersion was prepared at a solids concentration of 2 wt %, and stirred for 20 minutes to ensure full hydration of the clay. The clay was then surface modified to render it hydrophobic by onium exchange with polyisobutylene amine (BASF), having an average molecular weight of approximately 1500, at a concentration of 10 milliequivalents quaternary amine/100 g clay. The amine was mixed with deionized water at a concentration of 5 wt % and converted to a quaternary amine by stoichiometric addition of HCl. The phase separated quaternary amine/water solution was added to the stirred clay slurry over a period of 30 minutes. The resulting organoclay failed to flocculate sufficiently to enable recovery by filtration. This example demonstrates that the quaternary amine failed to react sufficiently with the clay surface due to its extremely low water solubility. The low water solubility of the quaternary amine is thus problematic. During the onium exchange process the insoluble surfactant is merely precipitated onto the surface of partially reacted clay agglomerates.

Example 1

In this example, an organoclay was prepared in accordance with the present invention by using a mixture of quaternary amines to render the clay surface hydrophobic and significantly reduce the surface HLB value. An organoclay product was prepared by dispersing a bentonite clay, with a CEC of approximately 85 milliequivalents/100 g clay (and having a yellow-green color due to Fe(II)/Fe(III) isomorphous substitution in the octahedral layer), in deionized water at 60° C. The dispersion was prepared at a solids concentration of 2 wt %, and stirred for 20 minutes to ensure full hydration of the clay. The clay was then surface modified to render it hydrophobic by onium exchange with dimethyl dihydrogenated tallow ammonium chloride (Arquad 2HT-75, Akzo Nobel) at a concentration of 85 milliequivalents quaternary amine/100 g clay. The quaternary amine was dispersed in deionized water at a concentration of 5 wt % and added to the clay slurry over a period of 30 minutes. The clay was then reacted with a second quaternary amine having a chain area approximately 5 nm$^2$. The amine (polyisobutylene amine, average molecular weight 1500, BASF) was mixed with deionized water and converted to the quaternary amine by stoichiometric reaction with HCl. The high-molecular-weight quaternary amine solution was added to the clay dispersion and stirred for 15 minutes, then filtered. The filter cake was added to polybutadiene (molecular weight of 5,000, Sigma-Aldrich) and mixed while heating to remove the remaining water. The product, containing approximately 5 wt % organoclay was colorless and transparent, indicating that the organoclay was fully dispersed and exfoliated. The unique characteristics of the present nanocomposite are its transparence and lack of color. This unique performance resulted from: 1) a lowering of the surface HLB value by using a mixture of surfactants having the approximate chain areas chosen to match the resulting area per cation on the clay surface, 2) a modification of the critical surface tension of the organoclay by incorporating a surfactant with a high molecular weight hydrocarbon chain (i.e., $>C_{20}$), and 3) disruption of the LLC structure of the organoclay by incorporation of a long chain surfactant (i.e., $>C_{20}$). While effective at producing a fully exfoliated nanocomposite, the approach is cumbersome and generates a significant amount of waste. Further improvements in the method of application of the surfactant to the organoclay are needed. These improvements are illustrated in Examples 2 through 5.

Example 2

This example illustrates a new approach to overcome the difficulty of completing the onium exchange of a smectite clay by a water-insoluble surfactant. In this example, 1.2 g of the water-insoluble surfactant, (polyisobutylene amine, average molecular weight 1500, BASF) was dispersed in 2 mL of deionized water containing 40 µL of concentrated HCl. The acid is used to convert 50% of the amine to a quaternary amine salt. Mixing the surfactant/water mixture produced a highly viscous, oil-in-water emulsion. To this emulsion, 1 g of sodium bentonite (Cloisite Na, Southern Clay Products) was added and mixed until a homogenous dispersion was obtained. The organoclay is dispersible in water and can be used to produce a latex emulsion for use in coating applications. It will be understood by those skilled in the art that additives can be included with the clay-based emulsion, such as film forming agents, cross linking agents, pigments, and the like, to impart desirable properties of increased chemical resistance in films and coatings.

The organoclay was further treated by mixing with paraffin wax at a 50:50 volume ratio. The compounding was done at approximately 100° C. to melt the wax and evaporate the water. During the mixing, a phase inversion occurred, whereby the organoclay separated from the water and was wetted out by the hydrophobic wax. The mixing was continued until the water was removed by evaporation. The organoclay was completely dispersed and exfoliated in the wax as judged by the lack of low angle scattering by visible light and by microscopic examination. The organoclay/wax nanocomposite was then dispersed into polypropylene by melt compounding. The organoclay immediately dispersed into the polymer to give a transparent nanocomposite with no detectable low-angle scattering of visible light. After cooling to room temperature, microscopic examination of the polymer nanocomposite revealed that the organoclay had completely dispersed in the polymer matrix with no visible indication of either undispersed or phase-separated clay.

This example illustrates a paradigm shift in the method of preparing organically modified phyllosilicates via onium intercalation with hydrophobic surfactants. Onium intercalation is hereby defined as ion exchange without either prior swelling or exfoliation of the clay.

A major cost associated with the production of conventional organoclays, as described by Jordan in U.S. Pat. No. 2,531,440, is the necessity to disperse the clay in a significant volume of water, followed by filtration and washing of the organoclay. Prior art methods (e.g., Knudson et al., U.S. Pat. No. 5,110,501) for producing organoclays with enhanced dispersion properties emphasize the need to disperse and fully exfoliate the clay in water before attempting onium exchange reactions. One or more washing steps are carried out to reduce the concentration of chloride salts (e.g., NaCl, $MgCl_2$, $CaCl_2$, un-reacted onium chloride) in the final organoclay. The metal chlorides are produced as a consequence of the ion exchange reaction between the surfactant and the clay surface. Furthermore, the filter cakes produced after filtration contain significant amounts of water due to the amphiphilic nature of organoclays produced by prior art methods. The organoclay filter cakes can contain 75%, or more, water by weight. The removal of this water by thermal treatment represents a significant portion of the cost of producing an organoclay. Additionally, the need to wash the filtercake to remove NaCl generates a significant amount of environmentally troublesome waste.

Surprisingly, organoclays that are directly dispersible in crystalline and semi-crystalline waxes and polymers may be prepared by the direct onium intercalation of amorphous quaternary amines without the need to first exfoliate the clay in water, as required in prior art (see for example U.S. Pat. Nos. 5,110,501; 5,807,629). This ability significantly reduces the cost of organoclay and nanocomposite production by eliminating the bulk of the water used in prior art methods for the production of organoclays. Furthermore, the approach described in this example shows that the organoclay is easily dispersed in hydrophobic systems such as crystalline and semi-crystalline waxes and polymers without the need to wash the hydrophilic reaction product (e.g., NaCl) from the organoclay. This ability further simplifies production and reduces the cost of manufacturing organoclays for polymer nanocomposite applications. While the preparation of an organoclay by extrusion mixing of clay/water/surfactant/polar activator combinations has been described in prior art (see U.S. Pat. No. 4,382,868) the approach was neither contemplated nor has it been demonstrated to be effective in the production of organoclays for use in preparing polymer nanocomposites. In fact, all examples in prior art methods teach away from the use of onium intercalation for the production of organoclays intended for nanocomposite applications. The '868 patent is hereby incorporated by reference for its disclosure of extrusion mixing of clay/surfactant/water/polar activator combinations at high solids concentrations. As the Comparative Examples will show, extrusion mixing, in and of itself, does not produce organoclays demonstrating an inherent ability to produce a polymer nanocomposite.

This example further illustrates the advantage of matching the molecular area of the surfactant to the area of the adsorption sites on the clay surface. As a result, the entire surface of the clay is rendered hydrophobic. Additionally, the use of an amorphous surfactant enables more complete coverage of the mineral surface by eliminating the limitations of crystal phase packing generated when the surfactant hydrocarbon chains undergo a freeze transition. Surprisingly, the amorphous surfaces of organoclays produced by invention methods are miscible with an isotactic polypropylene melt and remain so even after cooling to room temperature. According to prior art (Chaiko, WO 2004/113429 A3), phase separation would have been reasonably expected because of the mismatch in the glass transition temperature ($T_g$) of the amorphous polymer chains and the surfactant. The $T_g$ of polyisobutylene is approximately –55° C., while that of the isotactic, polypropylene homopolymer is known to be approximately 10° C.

Example 3

In this example, an organoclay was prepared by onium intercalation with an amorphous, high-molecular-weight surfactant that is immiscible with water. The organoclay was prepared by first dispersing 1.2 g of polyisobutylene amine (BASF) having an average molecular weight of about 1500 into 3.3 g of deionized water containing 80 µL of concentrated HCl. The amount of acid used in this example is sufficient to convert all of the amine to the HCl salt. The surfactant/water mixture was mixed until a homogeneous, white emulsion was formed. The highly viscous emulsion was then combined with 1 g of sodium montmorillonite (Cloisite Na, Southern Clay Products) and mixed until a homogeneous dispersion was produced. Increasing the temperature to between about 60° C. to about 80° C. resulted in an immediate and significant increase in viscosity as the surfactant intercalation proceeded toward completion.

The hydrophobic organoclay was then melt compounded with a semi-crystalline polypropylene wax at a 50:50 volume ratio. With the addition of heat, the wax melted and wetted the organoclay. While the remaining water evaporated from the system, the organoclay exfoliated to produce a highly transparent nanocomposite with no detectable small-angle scattering of visible light. Microscopic examination of the nanocomposite, after cooling to room temperature, confirmed that the organoclay had been fully dispersed and exfoliated, and remained so even after cooling below the crystallization temperature of the wax.

This example confirms that when a smectite clay is treated to the full extent of its ion exchange capacity by onium intercalation, an extremely hydrophobic organoclay is produced that is readily miscible with either crystalline or semi-crystalline polymers and waxes displaying a $T_g$ that is significantly different from the $T_g$ of the organoclay surface.

Example 4

This example demonstrates the ability of inventive organoclays to disperse and exfoliate without the need for any specific treatment of the clay edge, nor the addition of coupling agents, like maleated oligomers or polymers, or dispersing agents, such as polyethylene mono-alcohol, poly(ethylene glycol)-block-polyethylene, and the like, as taught in prior art (for example see U.S. Pat. Nos. 6,864,308 B2; 6,407,155 B1).

The organoclay prepared in Example 3 was fashioned into a thin film and dried at room temperature for 2 hours. The neat organoclay was melt compounded into isotactic polypropylene homopolymer at an organoclay loading of approximately 5 wt %. The organoclay rapidly wetted out and dispersed into the polymer melt to produce a transparent and colorless nanocomposite melt. The nanocomposite melt did not show any low-angle scattering of visible light, indicating that the organoclay/polymer mixture produced a single phase which was a nanocomposite. Furthermore, the absence of color indicates that the clay platelets are exfoliated. Without wishing to be limited to any specific theory, it is believed that the presence of a yellow-green color in conventional organoclay dispersions is generated by intervalence electronic transfer between $Fe^{2+}/Fe^{3+}$ pairs, and that when electron transfer between clay platelets is interrupted by exfoliation, adsorption of visible light and color generation is halted.

Comparative Example 3

In this example, the failure of organoclays prepared by prior art methods to exfoliate in a hydrophobic wax system is demonstrated. A combination of polypropylene wax and a commercially available organoclay (i.e., Cloisite 15A, which is produced by ion exchange of the sodium montmorillonite with dimethyl dihydrogenated tallow ammonium chloride), at a ratio of 1:1 by volume, was mixed at a temperature of about 60 to about 80° C. The organoclay was rapidly wetted by the wax, but a great deal of low angle scattering of visible light was present in the melt. Furthermore, microscopic examination of the mixture revealed the presence of a two-phase system—an organoclay gel phase which was dispersed and in equilibrium with the wax phase.

Comparative Example 4

In this example, the importance of using surfactants capable of completely covering the clay surface at loading levels equal to the cation exchange capacity of the clay is illustrated. Also illustrated is the failure of prior art methods to produce organoclay/polymer nanocomposites. The surfactant, dimethyl dihydrogenated tallow ammonium chloride (Arquad 2HT-75, Akzo Nobel) was dispersed into 2 g of deionized water at a concentration sufficient to produce approximately 1.4 g of organoclay containing 0.085 equilivants surfactant per 100 g clay (i.e., 0.66 g of Arquad 2HT-75). To the surfactant dispersion was added 1 g of sodium montmorillonite (Cloisite Na, Southern Clay Products) and the mixture was mixed at room temperature to produce a homogenous paste. The mixture was then heated to about 60° C. to about 80° C. and mixed further for 5 minutes. The organoclay was then blended, by melt mixing, with polypropylene wax at a ratio of 1:1 by volume. The failure of the clay to disperse in the wax is an indication that the organoclay surface contains both hydrophobic and hydrophilic domains, and is therefore not able to disperse and exfoliate in hydrophobic polymer systems.

Comparative Example 5

In this example, the importance of using surfactants in accordance with the present invention is further illustrated. An organoclay was prepared by onium intercalation with trioctyl methyl ammonium chloride (Aliquat 128, Sigma-Aldrich). This surfactant is extremely hydrophobic and not dispersible in water. The molecular area of the surfactant is determined from molecular models to be approximately 0.8 nm$^2$, which is virtually identical to the area per base exchange site for montmorillonite clays, as reported by Lagaly (Layer charge characteristics of 2:1 silicate clay minerals; p. 5, CMS workshop lectures, Vol. 6, The Clay Minerals Society). To prepare the organoclay, 0.34 g of surfactant was combined with 2 g of deionized water and then blended with 1 g of sodium montmorillonite (Cloisite Na, Southern Clay Products). The homogeneous dispersion was then heated to 60-80° C. and mixed for an additional 5 minutes. The organoclay was then melt compounded with a polypropylene wax at a 1:1 ratio by volume at a temperature of about 60° C. to about 80° C. The organoclay failed to disperse into the wax, producing a cloudy dispersion with significant amounts of precipitated material.

This example illustrates that the use of extremely hydrophobic surfactants in the preparation of an organoclay is not sufficient, in and of itself, to yield an organoclay capable of dispersion and exfoliation in hydrophobic polymers and waxes. The molecular area of the surfactant in this example is insufficient to completely cover the clay surface when the clay is treated to its full cation exchange capacity. The resulting organoclay surface is therefore amphiphilic, being composed of both hydrophilic and hydrophobic domains in roughly a 1:1 ratio.

Comparative Example 6

In this example an organoclay was prepared by mixing 2.4 g of Kerocom PIBA03 (BASF) with 80 µL of concentrated HCl to convert the polyisobutylene amine to the HCl salt. The HCl salt was then blended with 1 g of montmorillonite (Cloisite Na, Southern Clay Products). The mixture was then heated to about 60° C. to about 80° C. and mixed for an additional 5 minutes. The mixture remained opaque. The clay/surfactant mixture was blended with polypropylene wax at a ratio of 1:1 by volume at a temperature of about 100° C. The organoclay failed to disperse and instead produced an opaque dispersion. This flocculated system is not suitable for producing either wax or polymer nanocomposites.

This example demonstrates that, counter to intuition, the presence of water is a critical factor in promoting successful onium intercalation when using water-insoluble onium salts. Other examples and comparative examples provided herein also demonstrate that the concentration of water relative to the weight of the dry clay is a critical component of the present invention for producing an organoclay suitable for the production of polymer nanocomposites.

Example 5

This example illustrates the point that organoclays which readily disperse into polyolefins without the aid of dispersants or compatibilizers, like maleated polymers or oligomers, possess critical surface tensions closely matching the surface tension of the polymer phase. In this example, contact angle data were used to characterize the wetting behavior of an organoclay surface. Furthermore, the critical surface tension of the organoclay surface was then calculated using standard methods known to those skilled in the art. Technical Note 306, Krüss GmbH is hereby incorporated by reference for its discussion of solid surface energy.

To estimate the surface energy of an organoclay, the Owens Wendt method was used to calculate solid surface energy from solid/liquid/gas contact angle measurements for two or more liquids whose values of the overall surface tension ($\sigma$) are known, and for which the dispersive component of the liquid surface tension ($\sigma^D$) and the polar component of the liquid surface tension ($\sigma^P$) are known. From these data, the overall surface energy of the solid ($\sigma_S$), the polar component of the surface energy of the solid ($\sigma_S^P$), and the dispersive component of the surface energy of the solid ($\sigma_S^D$) were calculated. Those skilled in the art will recognize that the dispersive component theoretically accounts for the van der Waals interactions between the solid surface and a liquid, while the polar component theoretically accounts for dipole-dipole, dipole-induced dipole, hydrogen bonding, and other site-specific interactions between the solid surface and a liquid. Organoclays which are most compatible with hydrophobic polymers like the polyolefins will display a minimal value in the polar component of the surface energy.

The Owens Wendt theory is mathematically described by:

$$\frac{\sigma(\cos\theta + 1)}{2(\sigma^D)^{1/2}} = (\sigma_S^P)^{1/2} \frac{(\sigma^P)^{1/2}}{(\sigma^D)^{1/2}} + (\sigma_S^D)^{1/2} \quad (1)$$

which is a linear function of $$\frac{\sigma(\cos\theta + 1)}{2(\sigma^D)^{1/2}} \text{ and } \frac{(\sigma^P)^{1/2}}{(\sigma^D)^{1/2}}. \text{ By plotting } \frac{\sigma(\cos\theta + 1)}{2(\sigma^D)^{1/2}} \text{ versus } \frac{(\sigma^P)^{1/2}}{(\sigma^D)^{1/2}}$$

it is possible to determine $\sigma_S^P$ and $\sigma_S^D$ from the slope and intercept, respectively. The overall solid surface energy ($\sigma^S$) is given by ($\sigma_S^P + \sigma_S^D$).

Contact angle data for several liquids on various organoclays are listed in Table 1. The advancing contact angles were measured using a standard technique known to those skilled in the art. The organoclay samples for the contact angle measurements were prepared by compression molding the organoclay at about 100° C. and about 4,000 psi to produce a smooth and highly reflective surface. The organoclay surface for contact angle measurement of the organoclay of Example 2 was prepared by coating a glass slide with a thin film using a knife edge. This procedure was required because of the amorphous nature of this organoclay. The surface tensions and the dispersive and polar components for the liquids in Table 1 are listed in Table 2.

The values of $\sigma_S$, $\sigma_S^D$, and $\sigma_S^P$ were obtained from the slope and intercept of Owens Wendt plots for each organoclay system. These values are listed in Table 3.

TABLE 1

Measured contact angle values for various organoclays.

| | Contact Angle, degrees | | |
|---|---|---|---|
| Organoclay | Water | Ethylene Glycol | Benzyl Alcohol |
| Bentone 38* | | 29 | 11.4 |
| Cloisite 15A | 84 | 64 | 48 |
| Example 1** | 77.3 | 63 | 46.5 |
| Example 4 | 83 | | 39.5 |
| Example 4*** | 90.5 | | 44.5 |

*Bentone 38 is an organoclay prepared from a natural hectorite and sold by Elementis Specialties, Inc.
**from U.S. Pat. No. 7,157,516 B2.
***Dried under vacuum for 2 hours at 110° C.

TABLE 2

Surface tension data for test liquids used in evaluating the surface energy of organoclays.

| Liquid | Surface Tension, RT (mN/m) | Dispersive Component (mN/m) | Polar Component (mN/m) |
|---|---|---|---|
| Water | 72.8 | 26.4 | 46.4 |
| Ethylene Glycol | 47.7 | 26.4 | 21.3 |
| Benzyl Alcohol | 39.0 | 30.3 | 8.7 |

TABLE 3

Surface energy data and surface HLB values for various organoclays.

| Organoclay | $\sigma_S$ (mN/m) | $\sigma_S^P$ (mN/m) | $\sigma_S^D$ (mN/m) | Surface HLB ($\sigma_S^P/\sigma_S^D$) |
|---|---|---|---|---|
| Bentone 38 | 42.2 | 22.4 | 19.8 | 1.13 |
| Cloisite 15A | 27.5 | 5.8 | 21.7 | 0.27 |
| Example 1* | 27.6 | 11.6 | 16.0 | 0.72 |
| Example 4 | 30.9 | 4.5 | 26.4 | 0.17 |
| Example 4** | 30.8 | 1.4 | 29.4 | 0.05 |

*from U.S. Pat. No. 7,157,516
**Dried under vacuum for 2 hours at 110° C.

The ratio ($\sigma_S^P/\sigma_S^D$) indicates the relative contributions of polar interactions and non-specific, non-polar interactions to the surface energy. Not wishing to be bound by any specific theory, it is believed that the value of this ratio is indicative of the relative size of hydrophilic and hydrophobic domains on the organoclay surface. The ratio ($\sigma_S^P/\sigma_S^D$) is defined herein as the surface HLB value. Bentone 38, prepared from Hector, CA hectorite and a product of Elementis Specialties has a significantly larger area per base exchange site compared to the other clay examples in Table 1, which are all prepared from Cloisite Na. This difference between base exchange sites is due to the lower ion exchange capacity of the hectorite (i.e., about 50 milliequilivants/100 g clay versus about 85 milliequilivants/100 g clay). This means that less of the hectorite surface is covered by the hydrophobic dimethyl dihydrogenated ammonium surfactant, thereby leading to a significant increase in the surface HLB value. The significant surface polarity explains why this organoclay will not disperse and exfoliate in polyolefin homopolymers even though the surface energy of 42.2 mN/m suggests that the amorphous polymer phase should wet the organoclay surface.

In accordance with an important embodiment of the present invention, preferred organoclays are those which will display $\sigma_S$ values that closely match the surface tension of the polymer in any particular organoclay/polymer nanocomposite, such that polymer wetting of the organoclay surface is maintained throughout melt compounding and in the final organoclay/polymer nanocomposite article during the thermal conditions of its intended use. Furthermore, organoclays of the present invention will display $\sigma_S^P/\sigma_S^D$ ratios less than about 0.2, and preferably less than about 0.15, and more preferably less than about 0.1 and most preferably less than about 0.05, while simultaneously displaying a total surface energy that closely matches the surface tension of the polymer matrix comprising an organoclay/polymer nanocomposite. For example, the surface energies of Cloisite 15A and the organoclay of Example 1 (U.S. Pat. No. 7,157,516) display surface energies significantly less than the interfacial tension of polyethylene and polypropylene at room temperature (i.e., 31 mN/m). From the Zisman equation ($\cos\theta = 1 - \lambda(\gamma_L - \gamma_C)$), we estimate a contact angle ($\theta$) of approximately 28 degrees between the amorphous polymer phase and the organoclay surface (Zisman, *ACS Advances in Chemistry Series*, Vol 43, p. 1, 1964). This represents a non-wetting condition, and explains why it is not possible to produce exfoliated nanocomposites in these polymers by direct melt compounding of the neat organoclays.

Alternatively, the surface energy of the organoclay of Example 4 is virtually identical to the interfacial tension of polyolefin homopolymers, and simultaneously displays a low surface HLB value. Drying for 2 hours under vacuum at 110° C. reduced the water content of the organoclay and had the effect of reducing $\sigma_S^P/\sigma_S^D$ from 0.17 to 0.05 without significantly affecting the overall surface energy. However, reducing the surface HLB value (i.e., $\sigma_S^P/\sigma_S^D$) provides for a more nonpolar organoclay surface, which in turn provides for more extensive non-polar interactions between the organoclay surface and the polymer. The estimated contact angle in this case is 3.3 degrees. Consequently, this organoclay readily dissolves into polymers like polyethylene and polypropylene homopolymers to produce transparent and colorless nanocomposites. From these data it is evident that even small differences in surface energy can have a profound influence on contact angles and wetting phenomena.

All references disclosed herein are specifically incorporated by reference thereto.

While exemplary embodiments of this invention have been described, it should be understood that changes and modifications can be made therein in accordance with ordinary skill in the art without departing from the invention in its broader aspects as defined in the following claims.

I claim:

1. A surface-modified filler consisting essentially of an amorphous polymeric surfactant adsorbed on at least the basal surface of said filler to produce a monolayer-layer coating, with said surface-modified filler having a surface HLB of no more than 0.20.

2. The surface-modified filler of claim 1 wherein said filler is a mineral.

3. The surface-modified filler of claim 1 wherein said filler is one or more minerals from the group consisting of hydrous metal hydroxides, and Phyllosilicates selected from the group consisting of smectites, vermiculites, micas, and brittle micas.

4. The surface-modified filler of claim 1 wherein said filler is one or more materials selected from the group consisting of minerals, plant material, animal material, carbon fiber, graphite, amorphous carbon, carbon nanotubes, and glass fiber.

5. The surface-modified filler of claim 1 exfoliated in a polymer.

6. The surface-modified filler of claim 1 intercalated by a polymer.

7. The surface-modified filler of claim 1 consisting essentially of an amorphous surfactant, as defined by the presence of a glass transition temperature, that is free of any organic solvents, polar activators, compatibilizers, clay-edge modifiers, or hydrotrope modifiers, and selected from the group consisting of cationic polymeric surfactants, anionic polymeric surfactants, and non-ionic polymeric surfactants associated with a surface of said filler.

8. The surface-modified filler of claim 1 having a surface HLB of no more than 0.15.

9. The surface-modified filler of claim 1 having a surface HLB of no more than 0.10.

10. The surface-modified filler of claim 1 having a surface HLB of no more than 0.05.

11. The surface-modified filler of claim 1 wherein said polymeric surfactant includes either a mono-modal, bi-modal, or multi-modal size distribution.

12. The surface-modified filler of claim 1 has no edge modifier.

13. A method of forming the surface-modified filler of claim 1 having a surface HLB of no more than 0.20 comprising adsorbing an emulsified, amorphous polymeric surfactant having either a mono-modal, bi-modal, or multi-modal size distribution onto the basal surface of a clay filler substantially in the absence of an organic solvent.

14. The method of claim 13 wherein said surfactant is an amorphous surfactant selected from the group consisting of trimethyl polyisobutylene amine and polyisobutylene amine salts of HCl, HBr, HI, $HNO_3$, $H_2SO_4$, $H_3PO_4$, $HCH_3SO_4$, CHOOH, $CH_3COOH$, and $CH_3CH_2COOH$.

15. A method of forming the surface-modified filler of claim 1 having a surface HLB of no more than 0.2 comprising:
(a) Emulsifying an amorphous surfactant with water substantially in the absence of an organic solvent; and
(b) Blending the emulsified surfactant with a filler to effect adsorption of the surfactant on at least a portion of the surface of said filler; and
(c) Drying the blend to reduce water content to less than fifty percent by weight.

16. The method of claim 15 wherein the emulsified, amorphous surfactant is an onium salt and wherein the ratio of the weight of the water to the weight of the onium salt in the emulsified surfactant is no more than about three.

17. The method of claim 16 wherein the onium salt is selected from the group consisting of polyisobutylene amine salts of HCl, HBr, HI, $HNO_3$, $H_2SO_4$, $H_3PO_4$, $HCH_3SO_4$, CHOOH, $CH_3COOH$, and $CH_3CH_2COOH$.

18. A surface-modified filler consisting of a mineral having a surface and an amorphous onium salt associated with at least a portion of said surface to produce a mono-layer coating and displaying a surface HLB of no more than 0.20.

19. The surface-modified filler of claim 18 wherein said onium salt is selected from the group consisting of trimethyl polyisobutylene amine and polyisobutylene amine salts of HCl, HBr, HI, $HNO_3$, $H_2SO_4$, $H_3PO_4$, $HCH_3SO_4$, CHOOH, $CH_3COOH$, and $CH_3CH_2COOH$.

20. The surface-modified filler of claim 18 wherein the water solubility of said onium salt is no more than about 1 percent by weight.

21. The surface-modified filler of claim 18 wherein the water solubility of said onium salt is no more than about 0.1 percent by weight.

22. The surface-modified filler of claim 18 wherein the water solubility of said onium salt is no more than about 0.01 percent by weight.

23. A surface-modified filler consisting essentially of an amorphous polymeric surfactant adsorbed on at least the basal surfaces of said filler to produce a mono-layer coating, with said surface-modified filler having a surface HLB of no more than 0.10.

24. The surface-modified filler of claim 23 wherein said filler is one or more materials selected from the group consisting of minerals, plant material, animal material, carbon fiber, graphite, amorphous carbon, carbon nanotubes, and glass fiber.

25. A surface-modified filler consisting of an amorphous polymeric surfactant adsorbed on at least the basal surfaces of said filler to produce a mono-layer coating, with said surface-modified filler having a surface HLB of no more than 0.05.

26. The surface-modified filler of claim 25 wherein said filler is one or more materials selected from the group consisting of minerals, plant material, animal material, carbon fiber, graphite, amorphous carbon, carbon nanotubes, and glass fiber.

* * * * *